United States Patent

Anderson et al.

Patent Number: 5,939,499
Date of Patent: Aug. 17, 1999

[54] THERMALLY STABLE HOT MELT MOISTURE-CURE POLYURETHANE ADHESIVE COMPOSITION

[75] Inventors: Gregory J. Anderson, Brooklyn Park; John M. Zimmel, St. Paul, both of Minn.

[73] Assignee: H.B. Fuller Licensing & Financing, Inc., St. Paul, Minn.

[21] Appl. No.: 08/100,696

[22] Filed: Jul. 30, 1993

Related U.S. Application Data

[63] Continuation of application No. 07/918,948, Jul. 22, 1992., abandoned, which is a continuation of application No. 07/502,980, Mar. 30, 1990., abandoned

[51] Int. Cl.$^6$ .................................................... C08K 20/00
[52] U.S. Cl. ........................................... 525/440; 525/454
[58] Field of Search ...................................... 525/440, 454

[56] References Cited

U.S. PATENT DOCUMENTS

| | | | |
|---|---|---|---|
| 3,832,314 | 8/1974 | Hoh et al. | 260/26 |
| 3,931,077 | 1/1976 | Uchigaki et al. | 260/26 |
| 3,932,326 | 1/1976 | Hoh et al. | 260/26 |
| 3,959,062 | 5/1976 | Hoh et al. | 156/313 |
| 4,048,128 | 9/1977 | Eastman | 260/22 |
| 4,059,715 | 11/1977 | Pletcher | 428/349 |
| 4,124,571 | 11/1978 | Georgoudis | 525/440 |
| 4,328,278 | 5/1982 | Sublett | 428/246 |
| 4,330,670 | 5/1982 | Sublett | 528/302 |
| 4,585,819 | 4/1986 | Reischle et al. | 524/196 |
| 4,775,719 | 10/1988 | Markevka et al. | 525/125 |
| 4,808,255 | 2/1989 | Markevka et al. | 156/307 |
| 4,820,368 | 4/1989 | Markevka et al. | 156/307 |

OTHER PUBLICATIONS

"Properties and Uses of DYVAX® Resin", a publication of DuPont.
"Product and Properties Guide for HYTREL®", a publication of DuPont.
Material Safety Data Sheet for BENZOFLEX®, a publication of Velsicol Chemical Corporation.
Product Data Sheet for FORAL® 105 Synthetic Resin, a Hercules Incorporated publication.
Technical Information Sheet for ISONATE®, a publication of the Upjohn Company.
Product Information Sheet for TERATHENE®, a publication of DuPont.
Material Safety Data Sheet for VYATHENE™, a publication of U.S. Industrial Chemical Company.
Product Data Sheet No. 7159–7 for KRISTALEX®, a publication of Hercules Incorporated.
International Search Report, International Application No. PCT/US 91/02216; DE,A,2014170; EP, A, 0248658; EP,A, 0125009; US,A, 4206299; and Adhesive Age, Nov. 1987, Atlanta, GA, US, pp. 32–35; Huber et al.: "Shaping Reactive Hot Melts Using LMW Copolyesters".

Primary Examiner—Robert Dawson
Attorney, Agent, or Firm—Nancy N. Quan

[57] ABSTRACT

Hot melt adhesive compositions combining the characteristics of thermoplastic hot melt adhesives and reactive adhesives can be prepared by blending a polyester polyether thermoplastic elastomer having the formula

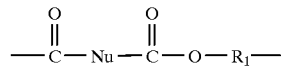

wherein Nu is a predominately cyclic nucleus and $R_1$ is randomly selected from either a $C_{2-6}$ alkylene or an amorphous polyether subunit comprising a polyoxyalkylene group with a polyisocyanate prepolymer. The resulting composition is flexible and may be used as an adhesive or as a sealant.

11 Claims, No Drawings

THERMALLY STABLE HOT MELT MOISTURE-CURE POLYURETHANE ADHESIVE COMPOSITION

This is a continuation, of application Ser. No. 918,948, filed Jul. 22, 1992, which was abandoned upon the filing hereof, which is a continuation, of application Ser. No. 07/502,980, filed Mar. 30, 1990, which was abandoned upon the filing hereof.

FIELD OF THE INVENTION

The invention relates to extrudable moisture-cure hot melt urethane adhesives comprising a urethane prepolymer and a segmented thermoplastic elastomer as well as methods of their manufacture.

RELATED ART

Hot melt adhesives and moisture-cure urethane adhesives are well known generic adhesive classes. Hot melt adhesives generally comprise thermoplastic materials which can be conveniently applied by extruding the adhesive composition at elevated temperatures onto a workpiece to which it is desired to fix another workpiece. The adhesive bond increases in integrity as the composition cools. Hot melt adhesives generally have good green strength, i.e., initial strength before complete setting of the bond, and they have the additional benefits of being easy to handle and free of solvents which must be evacuated during the setting or curing process of the adhesive. However, hot melt adhesives have the drawback that after cooling to form a bond line, the thermoplastic compositions can be temperature sensitive, in other words, the bonding mass can lose bond strength as the temperature of the work piece and the bond line increase. Further, hot melt adhesives tend to be physically unstable in the presence of hydrocarbon solvents and some organic compositions.

In sharp contrast, many curable urethane adhesives have little green strength. Thus, after the application of a curable urethane adhesive, the structure to be bonded must be externally supported until the urethane can cure to a strong, resilient, highly cross-linked bond line. Additionally, solvents may be used in these adhesives which may need to be evaporated during cure. However, once cured, these urethane adhesives have high tensile strength and have little or no temperature sensitivity. They also offer good resistance to many solvents after cure.

Clearly, a single adhesive composition displaying both curing and hot melt properties is a desirable goal, since the resulting adhesive, in theory, could possess quick, high strength green bonding and strong, cross-linked cured adhesive bonding.

One suggested adhesive is Uchigaki et al, U.S. Pat. No. 3,931,077 which discloses reactive, high viscosity hot melt adhesive compositions comprising a specific high viscosity reactive urethane prepolymer, a specific ethylene-vinyl acetate thermoplastic polymer and a phenolic or abietic acid type tackifying resin. Uchigaki suggests using ethylene-vinyl acetate thermoplastic copolymers containing 70–90 wt-% ethylene to achieve adhesives having good final adhesive strength.

Another type of hot melt adhesive is disclosed in U.S. Pat. No. 4,585,919 to Reichle et al which teaches the combination of an isocyanate prepolymer, a thermoplastic polyurethane or polyester, and a synthetic resin selected from the group consisting of ketone resins, hydrogenation products of acetophenone condensation resins, and mixtures thereof.

Marhevka et al, U.S. Pat. No. 4,775,719 discloses a thermally stable, hot melt moisture-cure polyurethane adhesive composition having a lower viscosity than Uchigaki, comprising an ethylene-vinyl monomer having an ethylene content of 55 wt-% or less, a polyisocyanate prepolymer and an aromatic tackifying resin. Marhevka et al, U.S. Pat. No. 4,808,255 discloses a thermally stable, moisture-cure urethane hot melt adhesive comprising a thermoplastic polymer, a compatible, curing urethane polyalkylene polyol prepolymer and a tackifying agent, and U.S. Pat. No. 4,820,368 to Marhevka et al discloses a thermally stable, moisture-cure urethane hot melt adhesive comprising a thermoplastic polymer, a compatible, curing urethane polyester polyol prepolymer and a tackifying agent. These adhesives form rigid bonds upon curing.

SUMMARY OF THE INVENTION

The present invention concerns an improved urethane hot melt adhesive composition having thermal stability that can be extruded to form an initially high green strength hot melt bond and which can moisture-cure to an adhesive bond. This adhesive composition comprises about 20 to 95 wt-% of a polyisocyanate prepolymer comprising the reaction product of a polyol and a polyfunctional isocyanate having an isocyanate functionality of about 2 or more and about 5 to 80 wt-% of a polyester polyether copolymer comprising a polymer having the formula

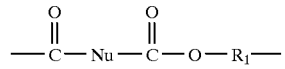

wherein Nu is a predominately cyclic nucleus and $R_1$ is randomly selected from either a $C_{2-6}$ alkylene or an amorphous, long-chain polyether subunit comprising a polyoxyalkylene group. This invention also concerns methods of making and using this novel, urethane hot melt adhesive composition. The term "adhesive" as used in the specification and the claims is meant to include both adhesive and sealant compositions.

By incorporating the polyester polyether copolymer above, the resulting moisture-cure hot melt achieves a high moisture vapor transmission rate (MVTR) allowing thicker adhesive films, exhibits excellent green strength, adheres well to polar substrates, results in a flexible, cured bond, and which can have residual tack, prior to cure, to act as a pressure-sensitive adhesive.

DETAILED DESCRIPTION OF THE PREFERRED EMBODIMENT

The present invention is addressed to a novel moisture-cure urethane hot melt adhesive composition which comprises a polyester polyether copolymer having the formula:

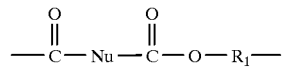

wherein Nu is a predominately cyclic nucleus and $R_1$ is randomly selected from either a $C_{2-6}$ alkylene or an amorphous, long-chain polyether subunit comprising a polyoxyalkylene group and a polyisocyanate prepolymer comprising the reaction product of a polyol and a polyfunctional isocyanate having an isocyanate functionality of about 2 or more.

THERMOPLASTIC

The thermoplastic of the present invention is a segmented thermoplastic with both hard and soft segments. This thermoplastic comprises a polymer having the formula

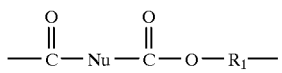

wherein Nu is a predominately cyclic nucleus and $R_1$ is randomly selected from either a $C_{2-6}$ alkylene or an amorphous, long-chain polyether subunit comprising a polyoxyalkylene group. The nucleus is preferably derived from a dicarboxylic acid which may be aromatic or aliphatic. The terms "dicarboxylic acid" and "diacid" as used in the specification and the claims is meant to include dicarboxylic acids, diacids, and their equivalents. The aromatic nucleus may be derived from aromatic dicarboxylic acids. Representative aromatic dicarboxylic acids include terephthalic acid, isophthalic acid, phthalic acid, substituted dicarboxy compounds with benzene nuclei such as bis(p-carboxyphenyl) methane, p-oxy(p-carboxyphenyl) benzoic acid, ethylene-bis(p-oxybenzoic acid), ethylene-bis-(p-benzoic acid), tetramethylene-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, indene dicarboxylic acid, and the like as well as ring substituted derivatives thereof such as $C_{2-10}$ alkyl, halo, alkoxy or aryl derivatives. Hydroxy acids such as p($\beta$-hydroxyethoxy) benzoic acid can also be used providing an aromatic dicarboxylic acid is also present.

Preferably the precursor to the nucleus is a methyl ester of the dicarboxylic acid. More preferably, the nucleus is derived from dimethyl isophthalate, dimethyl terephthalate, dimethyl cyclohexane dicarboxylate or mixtures thereof. Most preferably, the nucleus is a aromatic nucleus derived from a mixture of dimethyl isophthalate and dimethyl terephthalate.

The characteristics of $R_1$ determine whether the segment is a hard or a soft segment. In a hard segment, $R_1$ is a $C_{2-6}$ alkylene group, and it is preferably derived from aliphatic, alicyclic, or aromatic short chain diols with molecular weights of less than about 250. Preferably these diols are those with 2–15 carbon atoms such as ethylene, propylene, tetramethylene, isobutylene, pentamethylene, 2,2-dimethyltrimethylene, hexamethylene, and decamethylene glycols, dihydroxycyclohexane, cyclohexane dimethanol, resorcinol, hydroquinone, 1,5-dihydroxynapthalene, and the like. Especially preferred are the aliphatic diols of 2 to 6 carbon atoms. Suitable bisphenols include bis(p-hydroxydiphenyl), bis(p-hydroxyphenyl) methane, bis(p-hydroxyphenyl) methane, bis(p-hydroxyphenyl) propane and 2,2-bis(p-hydroxyphenyl) propane. Equivalent ester forming derivatives of diols are also useful. These diol derivatives may be used to form the diol in situ prior to forming the hard segment.

The soft segments are formed when $R_1$ is an amorphous, long chain polyether subunit. This subunit should have a molecular weight of about 350 to about 6,000, preferably about 350 to about 3,000 and most preferably from about 1,000 to about 3,000, a melting point of less than about 55° C. and a carbon:oxygen ratio of greater than about 2.5:1. Representative polyethers include the poly(alkylene oxide) glycols wherein alkylene is $C_{2-6}$ such as poly(1,2- and 1,3-propylene oxide) glycol, poly(tetramethylene oxide) glycol, poly(pentamethylene oxide) glycol, poly (hexamethylene oxide) glycol and poly (1,2-butylene oxide) glycol; random or block copolymers of ethylene oxide and 1,2-propylene oxide (used in proportions such that the carbon to oxygen mole ratio in the glycol exceeds 2.5:1) and poly-formals prepared by reacting formaldehyde with glycols, such as pentamethylene glycol, or mixtures of glycols, such as a mixture of tetramethylene and pentamethylene glycols.

Again, derivatives of the polyol may be used to form polyether subunit in situ prior to formation of the thermoplastic.

Preferably the polyether subunit comprises a polyoxyalkylene polyol having from 2 to 6 carbon atoms in the alkylene group. Most preferably, the polyoxyalkylene polyol comprises polytetramethylene ether glycol (PTMEG). "Polyol" as used herein the specification and the claims includes both diols and triols. One class of polyester polyether thermoplastic comprises compositions which comprise, based on the total thermoplastic components, (A) about 1 to 99 percent by weight of thermoplastic segmented copolyester elastomer consisting essentially of a muliplicity of recurring short chain ester units and long chain ester units joined through ester linkages, said short chain ester units amounting to about 15 to 75 percent by weight of said copolyester and being of the formula

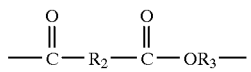

and said long chain ester units amounting to about 25 to 85 percent by weight of said copolyester and being of the formula

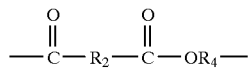

wherein $R_2$ is the divalent aromatic radical remaining after removal of the carboxyl groups from aromatic dicarboxylic acid having a molecular weight of less than about 350, $R_3$ is the divalent radical remaining after removal of the hydroxyl groups from organic diol having a molecular weight of less than about 250, and $R_4$ is the divalent radical remaining after removal of the terminal hydroxyl groups from long chain glycol or polyalkylene glycol having an average molecular weight of about 350 to 6000, said copolyester having a melt index of less than about 150 and a melting point of at least about 125° C., and (B) about 1 to 99 percent by weight of low molecular weight thermoplastic resin which forms compatible mixtures with the segmented copolyester, is thermally stable at 150° C., and has a melt viscosity of less than about 10,000 centipoises at 200° C. These compositions are disclosed in U.S. Pat. Nos. 3,832,314; 3,932,326; and 3,959,062 to Hoh et al, which references are herein incorporated by reference. Especially preferred are compositions according to the above formulas wherein $R_2$ is derived from terephthalic acid or a mixture of terephthalic and isophthalic acids, $R_3$ is derived from an organic diol such as butanediol and $R_4$ is derived from a long chain glycol such as polytetramethylene ether glycol (PTMEG).

Additionally, other thermoplastic components which will not detrimentally affect the adhesive character of the composition may be incorporated into the adhesive composition. Representative examples of these thermoplastic components include compatible vinyl polymers such as vinyl acetate-ethylene copolymers, ethylene-vinyl acetate and vinyl alcohol copolymers; and ethylene acrylic compounds including ethylene acrylate copolymers, ethylene methacrylate, ethylene butylacrylate, and ethylene hydroxyethyl acrylate. Preferably, the thermoplastic components comprise a vinyl polymer, a vinyl acetate-ethylene copolymer, or mixtures thereof. More preferably, the optional thermoplastic component comprises a high vinyl acetate content vinyl acetate-ethylene copolymer. Most preferably, this vinyl acetate-ethylene copolymer comprises about 40% to about 60% vinyl acetate.

PREPOLYMER

The polyisocyanate prepolymer of the present invention comprises the reaction product of a polyol and a polyfunctional isocyanate having an isocyanate functionality of about 2 or more. The polyol of the present invention may be either a polyether polyol, a polyester polyol, or mixtures thereof. Preferably, the polyol is a polyether polyol or a mixture of a polyether polyol and a polyester polyol. The polyether polyol is preferably a polyoxyalkylene polyol wherein the alkylene is $C_{2-8}$. Representative polyoxyalkylene polyols included the poly(alkyleneoxide) glycols wherein alkylene is $C_{2-8}$ such as poly(1,2- and 1,3-propylene oxide) glycol, poly(tetramethylene oxide) glycol, poly(pentamethylene oxide) glycol, poly(hexamethylene oxide) glycol, poly (heptamethylene oxide) glycol, poly(octamethylene oxide) glycol, poly(nonamethylene oxide) glycol and poly (1,2-butylene oxide) glycol; random or block copolymers of ethylene oxide and 1,2-propylene oxide (used in proportions such that the carbon to oxygen mole ratio in the glycol exceeds 2.5) and poly-formals prepared by reacting formaldehyde with glycols, such as pentamethylene glycol, or mixtures of glycols, such as a mixture of tetramethylene and pentamethylene glycols. Additionally, the dicarboxymethyl acids of polyoxyalkylene polyols can be used to form long chain polyols in situ as is known by those skilled in the art.

However, the preferred polyoxyalkylene polyol for use in the prepolymer of the present invention is polytetramethylene ether glycol (PTMEG). Most preferably, the polyol of the prepolymer is the same as that polyol used in the polyether polyester thermoplastic elastomer of the adhesive.

When mixtures of polyols are used in the prepolymer, the polyols must have partial compatibility with the polyether polyester thermoplastic used in the adhesive. The polyester polyols contemplated for use in the prepolymer of the present invention include those which are the reaction products of various polyols with aromatic or aliphatic dicarboxylic acids and polymers of lactones (e.g., polycaprolactone). Representative examples of the aromatic acids which may be used include teraphthalic acid, isophthalic acid and phthalic anhydride, Representative examples of aliphatic acids include sebasic acid, adipic acid and glutaric acid. Representative examples of polyols include ethylene glycol, butane diol, neopentylglycol, hexane diol, propylene glycol, dipropylene glycol, diethylene glycol and cyclohexane dimethanol.

The isocyanate used in the present invention is generally a cyclic polyfunctional isocyanate with a functionality of about 2 or more. Preferably, the functionality is about 2. The isocyanate may be aromatic or aliphatic. Representative examples of aromatic isocyanates include diphenyl methylene diisocyanate, tetramethyl xylene diisocyanate, isophorone diisocyanate, toluene diisocyanate. Representative examples of aliphatic diisocyanates include hexamethylene diisocyanate, hydrogenated MDI, napthalene diisocyanate, dodecane isocyanate, dimer diisocyanate and all polymeric, trimeric isocyanates. Preferably, the isocyanate comprises diphenyl methylene diisocyanate, tetramethylxylene diisocyanate, isopherone diisocyanate, toluene diisocyanate, hexamethylene diisocyanate or mixtures thereof. Most preferably, the isocyanate comprises diphenyl methylene diisocyanate.

The isocyanate prepolymer may be stripped to less than 0.5% free isocyanate nonomer. One device useful for stripping unreacted isocyanate monomer is a wipe film evaporator. The use of stripped isocyanate prepolymer can result in improved safety in handling the adhesives.

OPTIONAL COMPONENTS

To improve the tack, and to impart pressure sensitive qualities to the adhesive, a tackifier may be incorporated into the adhesive composition. This tackifier may be a rosin ester, an aromatic resin, or mixtures thereof. Representative examples of rosin esters which are useful in the present invention include glycerol rosin ester, pentaerythritol rosin ester, and hydrogenated version of the above. Representative examples of aromatic resins include alphamethyl styrene resin, styrene monomer, polystyrene, coumorone, indene, and vinyl toluene. Preferably, the tackifier is an aromatic resin, and more preferably it is a styrene resin. Most preferably, the tackifier is alphamethyl styrene resin.

Fillers may be incorporated into the adhesive composition in the form of particulate matter, fibers, or powders. These fillers may be any filler materials which will not interfere with the other components in the adhesive composition. Types of fillers include calcium carbonate, ceramics, glass, silica, quartz, mica, treated clay, titanium dioxide, boron nitrides, graphite, carbon black, asbestos, metals, barium, sulfate, talc, or mixtures thereof. Preferred fillers include calcium carbonate, silica, clay, carbon black, or mixtures thereof.

Plasticizers may also be incorporated into the adhesive composition of the present invention. The plasticizer may be any composition which does not interfere with the efficacy of the other components and which facilitates processing and increases toughness and flexibility of the adhesive composition. Representative plasticizers include liquid aromatic ester plasticizers including dioctyl phthalate esters; solid plasticizers including dicyclohexyl phthalate, cyclohexane dimenthanol dibenzoate; and the plasticizers available under the SANTICIZER trademark available from Monsanto.

In addition to the above indicated optional components, various other compounds may be added to the adhesive composition. These compounds include catalysts, dyes, inhibitors, antioxidants, UV absorbers, waxes, adhesion promoters (e.g., silane) and other conventional additives.

SELECTION OF COMPONENTS

The selection of components for use in the adhesive composition depend upon its use in a variety of applications. Several possibilities follow, and they are not intended to be limiting of the possible combinations of components in the adhesive composition. First, the polyol of the prepolymer and that of the polyether polyester thermoplastic portion must be at least partially compatible. This results in a homogeneous adhesive composition with superior qualities. Preferably the polyols used in the two components are equivalent polyols, and most preferably they are the same polyol.

Improvements in residual tack of the adhesive composition may be obtained by incorporating selected tackifiers in the composition. Indeed, adhesives of the present invention can exhibit excellent pressure sensitive attributes when various tackifiers are used. However, tackifiers selected must be at least partially compatible with the polyether polyester thermoplastic and prepolymer components.

PREPARATION

Proportions of Reactants

The thermoplastic portion of the composition is separated into two parts: the polyester polyether thermoplastic and the compatible vinyl polymer. The thermoplastic is present from about 5 to about 80 wt-% of the adhesive composition. Preferably, it is present at about 5 to about 50 wt-%, and most preferably it is present at about 5 to about 35 wt-%.

The optional compatible vinyl polymer is present at about 0 to about 30 wt-%. Preferably it is used at about 5 to 25 wt-% and most preferably at about 5 to about 20 wt-%.

The isocyanate prepolymer is present at about 20 to about 95 wt-% of the adhesive composition. Preferably it is present at about 20 to about 50 wt-% and most preferably at about 25 to about 45 wt-%.

The tackifier is present at about 0 to about 60 wt-%, preferably from about 15 to about 50 wt-% and most preferably at about 25 to about 45 wt-%.

Silane may be incorporated in the composition for certain applications. It is present at about 0 to about 2 wt-%, and preferably it is present at about 0.5 to about 1 wt-%. Additionally, a filler may be present at about 0 to about 50 wt-%, plasticizer at about 0 to about 10 wt-% and a catalyst at about 0 to about 1.0 wt-%.

There are numerous methods of preparation of the adhesive composition of the present invention. Many of these will be obvious to those skilled in the art. One such variation is that the prepolymer may be prepared separately or simultaneously with the preparation of the adhesive composition.

METHOD OF USE

For use as an adhesive or sealant, the solid composition can be placed into a drum or pail, and platen type dispensing equipment can be used to deliver the adhesive. The adhesive can be extruded at about 95 to about 175° C. onto a substrate. Prior to the moisture-cure of the adhesive, a second substrate is contacted with the adhesive. The adhesive exhibits sufficient green strength such that external mechanical support is not needed while the adhesive moisture-cures. Substrates suitable for use with the adhesive of the present invention include glass, metal, polycarbonate, acrylic, ABS, PVC, vinyl, wood, etc.

The reactive hot melt urethane adhesive compositions of the invention can be cured in the bond line using a variety of mechanisms. The curing reaction occurs between a compound having an available active hydrogen atom and the NCO groups of the polyurethane prepolymer. A variety of reactive compounds having free active hydrogens are known in the art including water, hydrogen sulfide, polyols, ammonia, and other active compounds. Such curing reactions can be conducted by relying on the presence in the atmosphere such as moisture, of the active compounds or the active compounds can be added to the adhesive at the bond line.

One of the novel features of the adhesive of the present invention over the current state of the art is its higher moisture vapor transmission rate (MVTR) and $CO_2$ transmission rate. The adhesive can be applied in thicker beads, films or bond lines resulting in a thicker adhesive mass without foam formation.

EXAMPLES

The following specific examples, which contain the best mode, can be used to further illustrate the invention.

Example I

A polyisocyanate prepolymer was prepared by the following process. A reactor was charged with about 78 parts of a molten polytetramethylene ether glycol having a molecular weight of about 2900, and it was mixed under vacuum for about 30 minutes at about 75–80° C. The vacuum was broken by establishing a nitrogen atmosphere over the molten polyol. About 22 parts of diphenylmethylene diisocyanate flakes were added to the reactor under positive nitrogen pressure at about 75° C. The resulting reaction was allowed to proceed until the prepolymer product was less than about 5% NCO. The prepolymer was then discharged into and stored in clean, dry cans under a nitrogen blanket.

Example II 15 parts of a polyester polyether thermoplastic having a differential scanning calorimeter melting point of 123° C. and a melt index (AST D 1238) at 190° C. of 6 was added to a small jar and heated to 177° C. for 2 hours. About 15 parts of the polyisocyanate prepolymer of Example I was added to the melt and blended into it at 177° C. The melt composition had a viscosity of greater than 100,000 cps and on cooling, it had outstanding green strength and elastomeric properties. After 3 days the adhesive had increased substantially in tear and tensile strength.

A portion of the material is poured onto a nonstick surface and drawn into a film that was approximately 120 thousands of an inch thick. The material was allowed to cool overnight and then to cure at 25° C. and 50% relative humidity for 5 days. An ASTM type 5 die was used to cut the film into dogbones. The resulting tensile strength (an average of six samples) run at 10 inches per minute was 2400 psi with an elongation at maximum load of 850%. The cured film was very elastic and has high rebound.

Example III

A formulation incorporating a tackifier and a vinyl acetate-ethylene copolymer was prepared according to the following procedures. A premix of 80 g of an aromatic alphamethyl styrene tackifying resin having a ring and ball softening point of 97 to 103° C. and 80 g of a polyester polyether thermoplastic having a vicat softening point (ASTM D1525) of 80° C. and a melting point (ASTM D3418) of 159° C. was mixed at 375° F. until molten. An additional 240 g of the aromatic alphamethyl styrene tackifying resin and 80 g of an ethylene-vinyl acetate copolymer having a melt index of 3.5 and 51 wt-% vinyl acetate were added to the mixer, and a vacuum was established over the resulting melt for about 30 minutes. 320 g of the polyisocyanate prepolymer of Example I (except that the unreacted MDI is reduced to <0.5% in a wipe film evaporator) were added and mixed into the melt, and again a vacuum was established over the mixture for about 30 minutes. The mixture was then poured into containers and allowed to cool. Properties of the adhesive are shown below in Table I.

TABLE I

Test Results of an Adhesive
According to the Present Invention

| PHYSICAL PROPERTY | TEMPERATURE (°F.) | AVERAGE VALUE |
| --- | --- | --- |
| 7 DAY TENSILE | RT | 2000 psi |
| 7 DAY ELONGATION | RT | 2600% |
| 14 DAY TENSILE | RT | 3600 psi |
| 14 DAY ELONGATION | RT | 2400% |
| 21 DAY TENSILE | RT | 3500 psi |
| 21 DAY ELONGATION | RT | 2300% |
| 28 DAY TENSILE | RT | 4400 psi |
| 28 DAY ELONGATION | RT | 2400% |
| 14 DAY 200 g PAFTS | N/A | 313 °F. |
| 14 DAY 500 g SAFTS | N/A | 350 °F. |
| VISCOSITY | 300 | 100000 cP |
| VISCOSITY | 310 | 58000 cP |
| VISCOSITY | 320 | 31500 cP |
| VISCOSITY | 330 | 14000 cP |
| VISCOSITY | 340 | 10000 cP |
| VISCOSITY | 350 | 8250 cP |
| VISCOSITY | 360 | 7000 cP |

Comparative Example A

About 47.5 parts of an aromatic alphamethyl styrene tackifying resin having a ring and ball softening point of 97 to 103° C. and about 10 parts of ethylene-vinylacetate copolymer having a melt index of 3.5 and 51 wt-% vinyl acetate were added to a mixer at about 190° C. and mixed for about 30 minutes under vacuum. About 42.5 parts of the polyisocyanate prepolymer of Example I were added to the mixer and the composition was mixed under vacuum for about 30 minutes. The composition was then poured into containers and allowed to cool. Properties of the adhesive and a film drawn down from the above composition are illustrated in Table II.

TABLE II

Test Results of an Adhesive
According to the Current State of the Art

| PHYSICAL PROPERTY | TEMPERATURE (°F.) | AVERAGE |
| --- | --- | --- |
| 7 DAY TENSILE | RT | 2200 psi |
| 7 DAY ELONGATION | RT | 2300% |
| 14 DAY TENSILE | RT | 3100 psi |
| 14 DAY ELONGATION | RT | 2100% |
| 21 DAY TENSILE | RT | 3500 psi |
| 21 DAY ELONGATION | RT | 1800% |
| 28 DAY TENSILE | RT | 3900 psi |
| 28 DAY ELONGATION | RT | 1500% |
| 14 DAY 200 g PAFTS | N/A | 321 °F. |
| 14 DAY 500 g SAFTS | N/A | 325 °F. |
| VISCOSITY | 300 | 4100 cP |
| VISCOSITY | 310 | 3413 cP |
| VISCOSITY | 320 | 2775 cP |
| VISCOSITY | 330 | 2313 cP |
| VISCOSITY | 340 | 2000 cP |
| VISCOSITY | 350 | 1775 cP |
| VISCOSITY | 360 | 1600 cP |

The initial handling strength was estimated by testing maple block shear strength (at 0.015 inches/minute) as a function of time (25° C./50% relative humidity) after bond formation. The adhesive of Example III was compared to the adhesive of Comparitive Example A. The results, illustrated in Table III, show that the adhesive of Example III has improved handling strength and cure rate.

TABLE III

Maple Block Shear Strength

| Time | Example III | Comparitive Example A |
| --- | --- | --- |
| 15 minutes | 6 psi | 3 psi |
| 1 hour | 6 psi | 1 psi |
| 4 hours | 9 psi | 1 psi |
| 1 day | 41 psi | 2 psi |
| 4 days | 550 psi | 2 psi |
| 7 days | 480 psi | 550 psi |

Example IV 255.9 g hexane diol was heated in an oven at 60° C. prior to use. 288.0 g Isophthalic Acid, 255.9 g hexane diol and 2.75 g of an antioxidant were added to a reactor flask. The reactor was then heated beyond 100° C. at which time 3.3 g hydrated monobutyltin oxide catalyst were added. The temperature was increased to 240° C. and held for two hours during which time the mixture became clear. A vacuum was established over the mixture for about one hour until the acid number fell to less than 2. The mixture was then poured onto a flat surface and allowed to cool and crystalize to form an IPA-HD polyol. 68.1 g of the IPA-HD polyol prepared above, 175.8 g of a polytetramethylene ether glycol having a molecular weight of about 2900 which was premelted at about 95° C., and 145.5 g of a polyester polyether thermoplastic having a vicat softening point (ASTM D1525) of 80° C. and a melting point (ASTM D3418) of 159° C. were added to a flask and heated to 180° C. A vacuum was established over the mixture, and the heat was reduced. Once the mixture reached about 170° C. mixing was stopped and flakes of pure diphenylmethylene diisocyanate were added. The mixing was recommended, and the mixture was heated up to 180° C. After the mixture was homogeneous, it was cooled and poured into quart cans under nitrogen atmosphere. The material was somewhat cloudy in appearance and easy to pour.

Example V 280 g of an aromatic alphamethyl styrene tackifying resin having a ring and ball softening point of 97 to 103° C., 80 g of an ethylene-vinyl acetate copolymer having a melt index of 18 and 51 wt-% vinyl acetate, and 120 g of a polyester polyether thermoplastic having a vicat softening point (ASTM D1525) of 80° C. and a melting point (ASTM D3418) of 159° C. were mixed at about 195° C. and evacuated for about 30 minutes. 320 g of a prepolymer made as in Example I (except that the unreacted MDI was reduced to <0.5% in a wipe film evaporater) was added, mixed for about 30 minutes and the material was evacuated for an additional 30 minutes and then poured into metal containers. SAFT after a two week cure at 50% R. H. at room temperature was >175° C. PAFT after a two week cure at 50% R. H. at room temperature was about 160° C. Tensile strength was 3300 psi and elongation was 230% after a two week cure at 50% R. H. at room temperature.

Example VI 35 parts of an aromatic alphamethyl styrene tackifying resin having a ring and ball softening point of 97 to 103° C. and 25 parts of polyester polyether thermoplastic having a vicat softening point (ASTM D1525) of 80° C. and a melting point (ASTM D3418) of 159° C. were mixed at about 195° C. 40 parts of a prepolymer made as in Example I (except that the unreacted MDI was reduced to <0.5% in a wipe film evaporater) was added and mixed and then poured into metal containers. SAFT after a two week cure at 50% R. H. at room temperature was >145° C. PAFT after two week a cure at 50% R. H. at room termperature was about 160° C.

The Examples and data shown above indicate that the compositions of the invention can be blended into reactive hot melt urethane adhesives having both hot melt and curing adhesive properties. The adhesives can be blended to have cured bonds with superior heat resistance. Further, the cured adhesives can have ultimate tensile strengths in the range of about 2,000 to 4,400 psi and ultimate elongation at break in the range of about 850 to 2,600%. Such data indicates that the blended components cooperate to provide the combined properties of a hot melt adhesive and achieved curing urethane adhesive properties. Further, the adhesives can be blended to have superior heat resistance.

The data shown above were developed using the following procedures.

200 Gram Peal Test (PAFT)

500 Gram Shear Test (SAFT)

Scope:

Kraft paper is laminated to form a one inch by one inch bond area. Weights are attached in the peel and shear modes and the samples are placed in an oven. The oven is programmed to increase temperature at a certain rate. The temperature at which the bond delaminates is recorded.

Equipment:
1. Programmable oven capable of a 25% C. per hour increase from 25° C. to 150° C.
2. 40 pound basis weight kraft paper.
3. 200 and 500 gram weights.
4. Device for monitoring oven termperatures.
5. Device for supporting samples in the oven.
6. Release paper.
7. Two glass rods, each one-half inch in diameter and eight inches long. One glass rod should have a ten mil shim at each end.

Sample Preparation
1. Cut two sheets of kraft paper, each six inches by twelve inches.
2. Cut two pieces of release paper, each two inches by twelve inches.
3. Tape one piece of kraft paper to a heat insulator such as a tablet back, heavy chip board, etc.
4. Tape the two pieces of release paper to the kraft lengthwise in the center, exactly one inch apart.
5. Lay the second piece of kraft paper on top of the release paper so it entirely covers the first piece of kraft paper. Tape one end only of the second piece of kraft to the composite.
6. Fold back the second piece of kraft and place the shimmed glass rod on the tape "hinge".
7. Place the unshimmed glass rod below the second sheet of kraft paper as close to the tape "hinge" as possible. (The second piece of kraft is now between the two glass rods. The shimmed rod is on top in view. The unshimmed rod is partially concealed by the second piece of kraft because it is folded back.)
8. Pour a stream of hot melt at its normal application temperature, (e.g., 350° F.) onto the first piece of kraft between the release paper.
9. Quickly push both glass rods across the bottom sheet of kraft paper. (The shimmed glass rod will draw the hot melt into a film, and the second rod will pull the second piece of kraft paper over the first to form a bond.)
10. Trim the "sandwich" widthwise to four inches and lengthwise to six inches.
11. Cut the "sandwich" widthwise into six pieces, each one inch by four inches.
12. Allow bonds to fully cure in a room at 50% RH, 25° C.

Procedure:
1. Suspend the six samples, from one "tail" in the oven.
2. Attach a 200 gram weight to a tail of each of three samples in the peel mode.
3. Attach a 500 gram weight to a tail of each of three samples in the shear mode.
4. Start the oven at 25° C. and increase the temperature continuously at 25° C./hour.
5. Observe the samples and note the temperature at which the samples delaminate and the weight falls.

Report:
Report the average termperature at which the three peel and three shear samples fail.

Tensile/Elongation Test

Scope:
This test peroceduce describes the method whereby the tensile characteristics can be determined at a constant strain rate.

Equipment:
1. Instron tensile tester or equivalent.
2. Teflon drawdown sheet.
3. ASTM D-412 Type C die.
4. Micrometer.

Sample Preparation:
1. Prepare a 20–30 mil adhesive film. The film must be void free.
2. Allow the film to cure at a room at 50% RH, 25° C.
3. Cut at least five samples from the film with the ASTM D-412 Type 5 die.
4. Measure the film thickness of each sample at the gauge section in the middle and record. If properly cut, the sample should have a gauge section width of 0.25 inches, but check to be sure.
5. Condition the samples for at least 18 hours at 25° C., 50% relative humidity.

Test Procedure:
1. Set the tensile tester jaws to a 2" gap, and attach the sample.
2. Elongate at the constant strain rate of 10" per minute until the sample breaks, while recording the stress versus strain.
3. Repeat steps 1 and 2 with the remaining samples.

Calculations:
1. Tensile stress—calculate the tensile by dividing the force by the cross-sectional area of the sample.
2. Strain elongation—calculate the elongation by dividing the sample length or tensile tester jaw gap at the point in question by the initial sample gap and multiply by 100%.

Report:
1. Elongation at break as the average of at least 5 samples.
2. Ultimate tensile and elongation at the highest point of stress as the average of at lest 5 samples.
3. Tensile and elongation at the yield point as the average of at least 5 samples.

The specification, Examples, data and discussion set forth above provide a detailed disclosure of the invention. However, since a variety of embodiments of the invention can be made without departing from the spirit and scope of the invention, the invention resides in the claims hereinafter appended.

What is claimed is:

1. A solvent free, moisture curable urethane hot melt adhesive composition having thermal stability that can be extruded to form an initially high green strength hot melt bond and can moisture-cure to an adhesive bond, which composition comprises:
   (a) about 5–80 wt-% of a polyester polyether copolymer comprising a polymer having the formula:

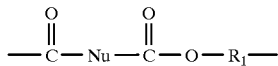

wherein Nu is a predominately cyclic nucleus and $R_1$ is randomly selected from either a $C_{2-6}$ alkylene or an amorphous, long-chain polyether subunit comprising a polyoxyalkylene group; and
   (b) about 20–95 wt-% of a polyisocyanate prepolymer comprising the reaction product of:
      (i) a polyol; and
      (ii) a polyfunctional isocyanate having an isocyanate functionality of about two or more wherein said polyfunctional isocyanate is present in a concentration sufficient to form said polyisocyanate prepolymer and provide free isocyanate functionality to cure said adhesive composition through reaction with moisture.

2. The composition of claim 1 in which Nu is derived from a cyclic diacid.

3. The composition of claim 2 in which the cyclic diacid comprises an aromatic diacid.

4. The composition of claim 3 in which the aromatic diacid comprises terephthalic acid or isophthalic acid or mixtures thereof.

5. The composition of claim 1 in which the long-chain subunit comprises a polyether glycol moiety.

6. The composition of claim 5 in which the polyether glycol moiety comprises a polytetramethylene ether glycol moiety.

7. The composition of claim 1 in which the polyol comprises a polyether polyol, a polyester polyol, a polyalkylene polyol or mixtures thereof.

8. The composition of claim 7 in which the polyol comprises a polyether polyol.

9. The composition of claim 8 in which the polyether glycol comprises polytetramethylene ether glycol.

10. The composition of claim 1 in which the isocyanate comprises diphenylmethylene diisocyanate, tetramethyl xylene diisocyanate, isophorone diisocyanate, toluene diisocyanate, hexamethylene diisocyanate or mixtures thereof.

11. The composition of claim 10 in which the isocyanate comprises diphenylmethylene diisocyanate.

* * * * *